July 13, 1937.  W. RAISCH  2,086,821
SCREEN CLEANING
Filed June 12, 1935    4 Sheets-Sheet 1
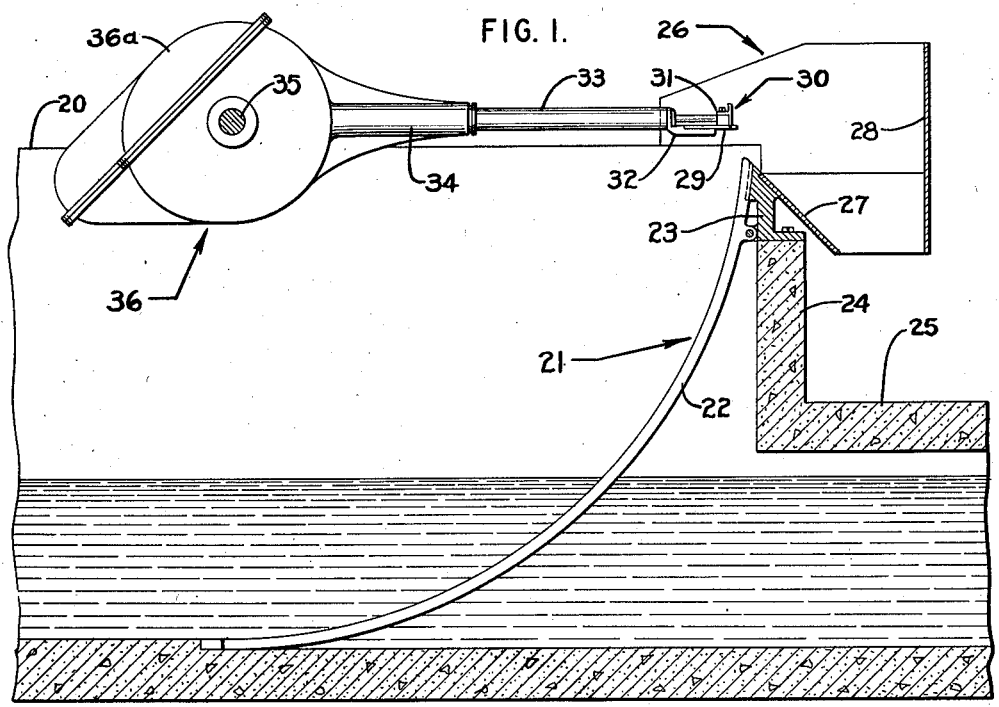
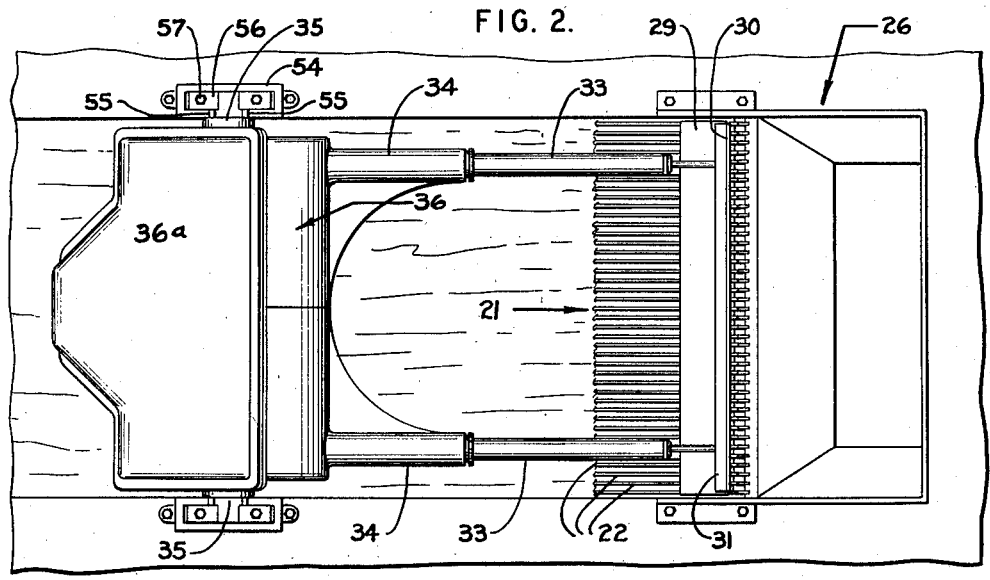
INVENTOR
William Raisch
BY
Louis L. Ansart
his ATTORNEY

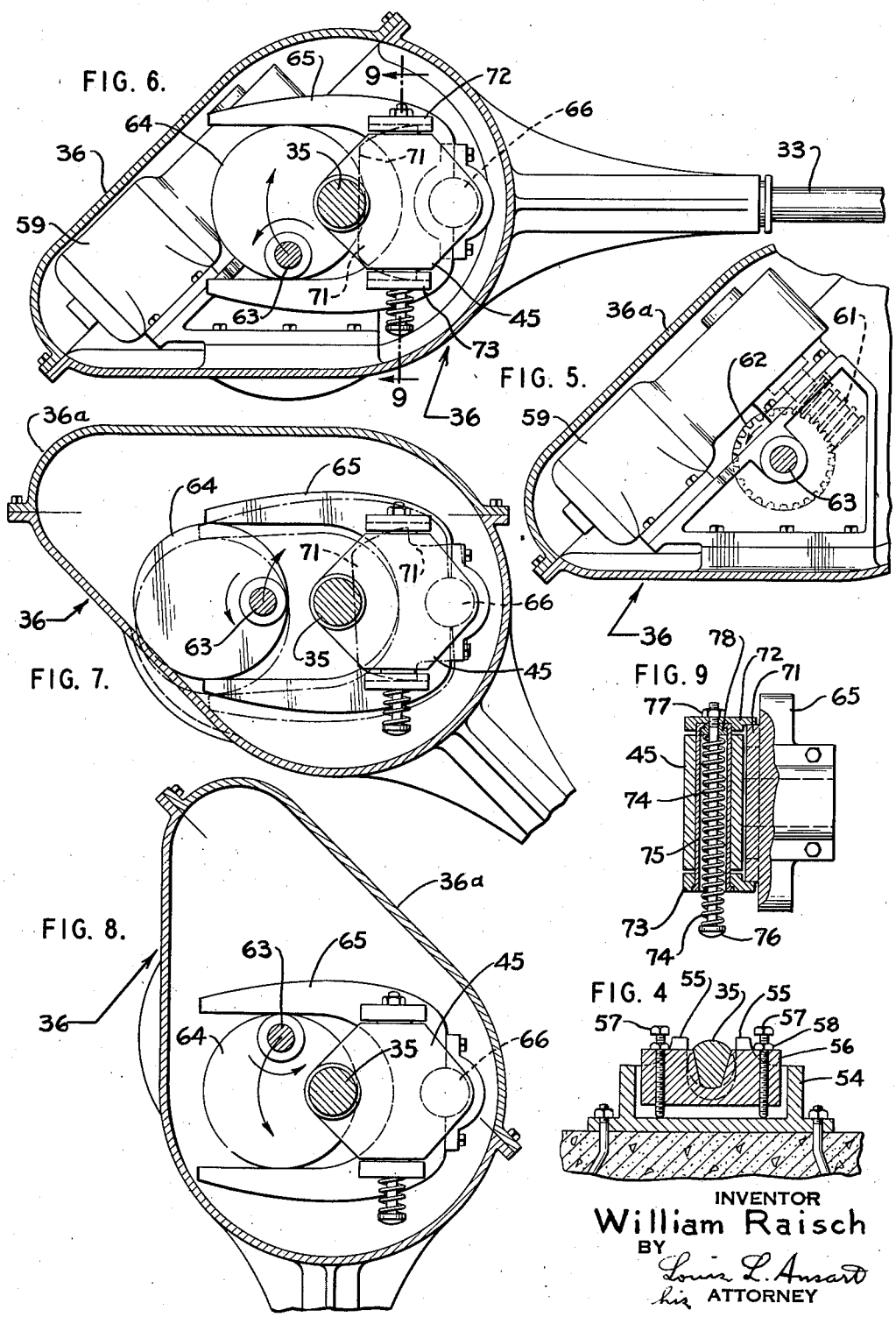

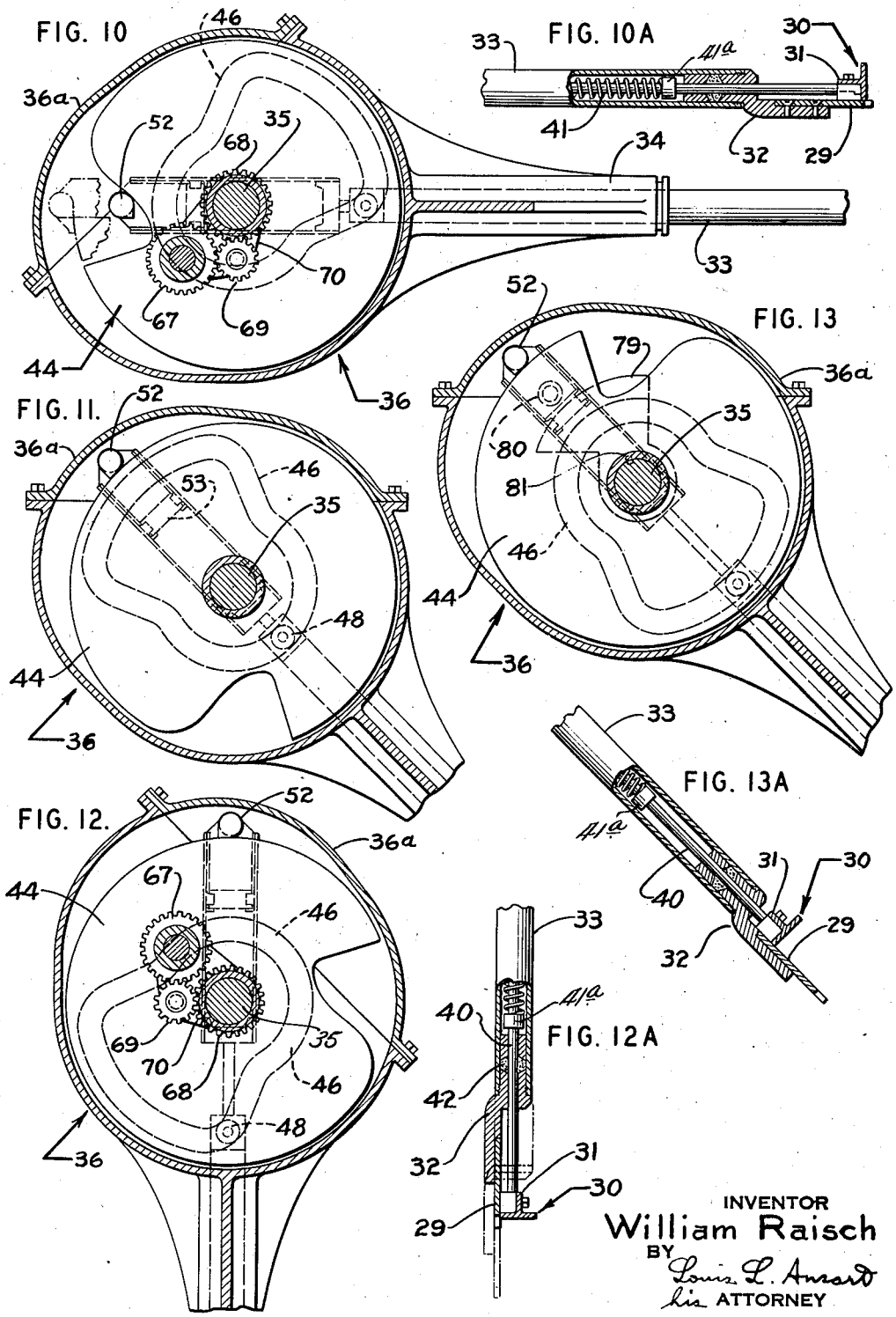

Patented July 13, 1937

2,086,821

UNITED STATES PATENT OFFICE 2,086,821

SCREEN CLEANING

William Raisch, Forest Hills, N. Y., assignor to Underpinning & Foundation Company, Inc., New York, N. Y., a corporation of New York Application June 12, 1935, Serial No. 26,156

15 Claims. (Cl. 210—176)

The present invention relates to cleaning means for bar screens and the like, such as are used in connection with sewage treatment and disposal.

Heretofore there have been developed for this purpose various forms of cleaning apparatus, in certain forms of which a cleaning device, such as a rake, is operated in cycles including an upward movement of the rake along the bars of the bar screen while in cooperative relation therewith, retraction of the rake substantially at the upper end of its path, downward movement of the rake while withdrawn from the bar screen, and movement of the rake into a cooperative relation with the screen while the rake is in substantially its lowermost position. The cleaning apparatus is also provided with an ejector which is advanced to discharge the collected detritus from the rake when the latter is in substantially its uppermost position, the ejector being then withdrawn and held in retracted position until the rake again moves to its uppermost position. The present invention relates in general to improvements in this general type of apparatus.

Important objects of the present invention relate to the provision of novel methods of and means for cleaning bar screens and the like. Another object relates to the provision of operating means adapted to operate the screen cleaning apparatus smoothly and without the creation of sudden and considerable stresses and strains which might cause trouble and breakage. Another object of the invention relates to the provision of means whereby if the rake be stopped in its upward movement by objects or material caught by the screen the rake will continue an upward and downward movement in a shortened path and will have a cleaning effect on part of the screen surface. Another object of the invention relates to the provision of means whereby the ejector is permitted to operate only when the rake is substantially in its uppermost position. Such means would prevent the operation of the ejector while the rake is moving in the aforesaid shortened path. Important features of the invention relate to the provision of very compact forms of operating means for the rakes and ejectors and the enclosure in suitable casings of all working parts.

Other objects, features and advantages will appear upon consideration of the following description and of the drawings in which:

Fig. 1 is a sectional view in side elevation of a bar screen and screen cleaning means embodying a preferred form of the invention;

Fig. 2 is a plan view of the structure illustrated in Fig. 1;

Fig. 4 is a section taken along the line 4—4 of Fig. 3;

Fig. 5 is a fragmentary sectional view showing the electric motor and speed reducing means for operating the cleaning means;

Fig. 6 is a section taken along the lines 6—6 of Fig. 3, the rake being in raised position;

Fig. 7 is a view similar to Fig. 6 but illustrating the positions of certain parts when the rake has been swung downwardly substantially 45 degrees from its uppermost position;

Fig. 8 is a view similar to Fig. 7 showing the positions of the parts when the rake is in its lowermost position;

Fig. 9 is a section taken on the line 9—9 of Fig. 6;

Fig. 10 is a section taken along the line 10—10 of Fig. 3;

Fig. 10A is a fragmentary view, partly in section, of the outer end of a rake-carrying arm with the ejector in advanced position;

Fig. 11 is a view similar to Fig. 10 showing the positions of certain parts when the rake has moved downwardly through 45 degrees;

Fig. 12 is a view similar to Figs. 10 and 11 showing the position of certain parts when the rake is in its lowermost position;

Fig. 12A is a view corresponding to Fig. 10A but showing the rake in its lowermost position just before advance of the rake to cooperate with the bar screen;

Figure 3:
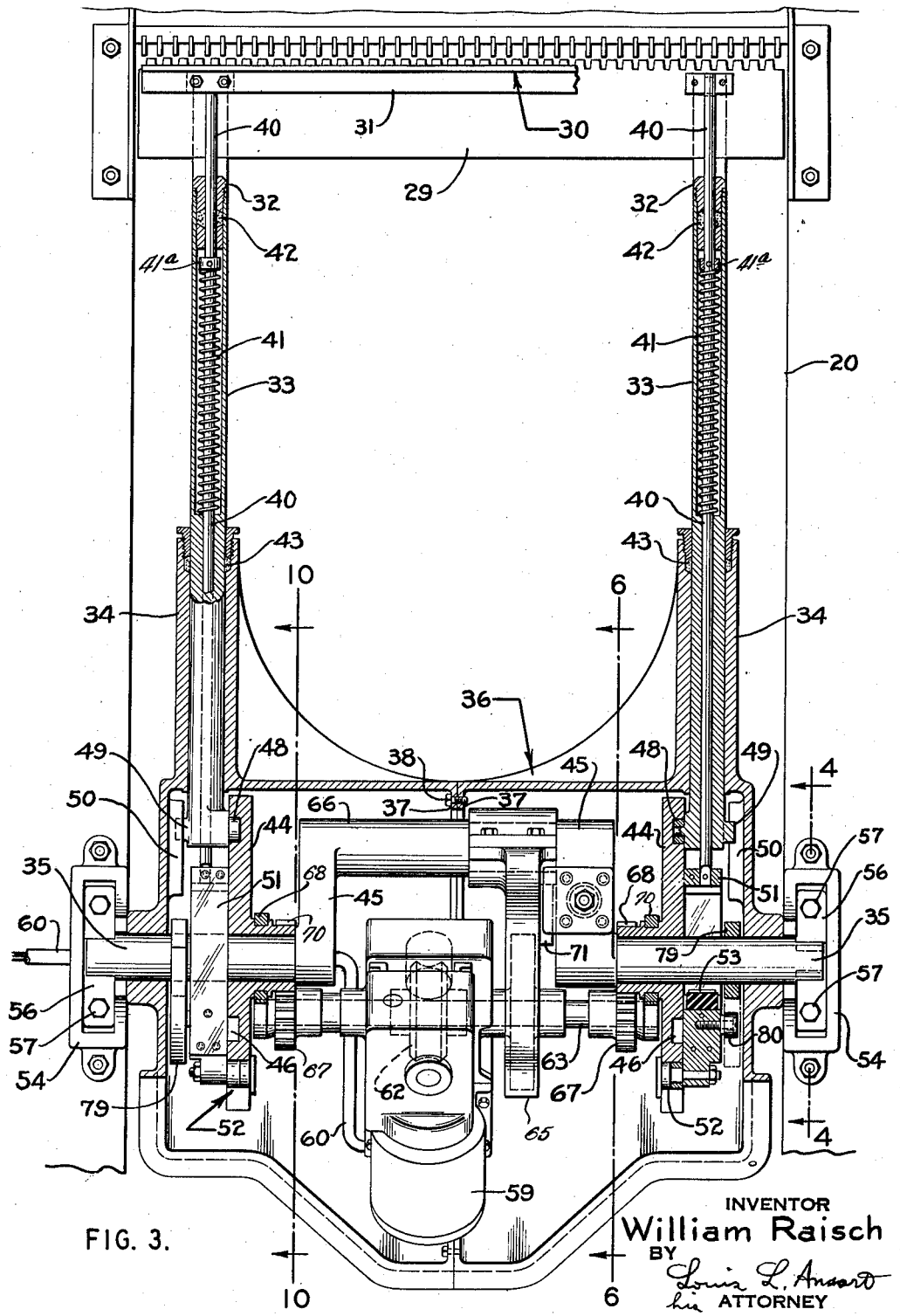
Fig. 3 is a view on a larger scale of the structure shown in Fig. 2, with the upper part of the casing removed and other parts broken away to show underlying structure.

Fig. 13 is a view similar to Fig. 11 but indicating positions assumed by certain parts during the upward movement of the rake and showing means for preventing advance of the ejector except when the rake is in its uppermost position; and Fig. 13A is a view similar to Figs. 10A and 12A but showing the positions of the parts when the rake has moved upwardly to a position corresponding to the showing in Fig. 13.

Referring to the drawings, reference character 20 designates a section of a conduit such as a sewer, such section being open at its top to permit the removal at that location of waste material or detritus collected by a screen 21. As illustrated, the screen is made up of a plurality of bars 22 in the general shape of circular arcs secured at their upper ends to a support 23 mounted on the top of a wall 24 extending transversely of the sewer and projecting upwardly from a bridge 25, said support 23 also carrying a hopper 26 to receive detritus removed from the screen and ejected over the top of the screen. Preferably the hopper 26 is provided with an inclined portion 27 extending from the edge of the screen over the top of the wall to assure removal of material which in the operation of ejection is just carried over the wall 24, and an opposite wall 28 to catch detritus thrown farther from the screen and direct it downwardly toward the bridge for disposal in any suitable manner.

To remove the accumulated detritus from the screen 21, use may be made of a cleaning device 29 in the form of a toothed plate or rake, and of rake-operating means whereby the rake is operated in a cycle which involves movement of the rake into cooperative relation with the lower part of the screen, upward movement of the rake along the screen to clean the screen and carry the removed detritus above the upper edge of the screen for ejection into the hopper 26, withdrawal of the rake from the screen, and downward movement of the rake while withdrawn from the screen. The removal of the detritus from the rake and ejection into the hopper 26 may be effected by an ejector 30 of which the effective portion is in the form of a plate with one edge thereof resting on or adjacent to the upper surface of the rake 29. The ejector may be provided at its rear side with a flange 31 extending longitudinally thereof to strengthen the same and provide means for connecting it with suitable operating means. One form of apparatus for supporting and operating the rake 29 and the ejector 30 will now be described.

The rake 29 is secured in suitable recesses in the upper sides of offset portions of members 32 secured in the ends of tubular members 33 slidable longitudinally in tubular extensions 34 of casing sections rotatably mounted on opposite ends of a fixed crank shaft 35. The casing sections form the main part of a casing 36 enclosing the main operating parts and may conveniently be secured together by inner flanges 37 secured together by suitable fastening device 38. When the apparatus is in use the casing is closed by a cover 36a.

The ejector 30 may be secured, in a manner indicated in Figs. 3 and 10A, to the forward ends of rods 40 extending substantially axially through the tubular members 33 to the inside of the casing 36, and these rods may be urged in a direction to operate the ejector by compression springs 41 on the rods 40 in the forward portion of the tubular members 33 and interposed between collars 41a secured to the rods and shoulders provided by a change in internal diameter of the members 33 from a size to accommodate the springs to a size just sufficient to receive the rods 40. Entrance of liquid into the tubular members 33 and the tubular extensions 34 may be prevented by the use of suitable packing 42 and 43.

Reciprocation and control of the tubular members 33 and the rods 40 may be effected by cam members 44 rotatable on the ends of the crank shaft 35 and provided with hubs extending to crank arms 45 of the crank shaft. Each of these cam members has a cam groove 46 at its outer face to control the operation of the adjacent tubular member 33 and a peripheral cam edge to control the movement of the adjacent rod 40 during normal operation. To enable its operation by the cam groove 46 of the adjacent cam member 44, each tubular member 33 is provided with a pivotally mounted roller or follower 48 projecting into the groove and the tubular member 33 is held against axial rotation by suitable means such as a lug 49 slidable between two ribs or flanges 50. Operation of each rod is provided for by attaching it to one end of a frame 51 having a slot to receive the crank shaft on which it slides, and providing at the other end of the frame a follower 52 for engagement by the cam edge of the cam member. Each cam groove 46 (Figs. 10, 11, 12, and 13) has two dwell portions corresponding to advanced and retracted positions of the rake 29 and two portions connecting the ends of the dwells, one of such connecting portions serving to retract the rake and the other serving to advance the rake. Each cam at the outer edge of a cam member 44 comprises a dwell portion extending around the greater part of the periphery, a substantially radial drop portion permitting quick release of the ejector, and a suitable lift portion to effect withdrawal of the ejector. To avoid unnecessary shock and possible damage when the forward movement of the ejector is checked by the crank shaft, each frame 51 is provided at the proper end of its slot with a cushioning device 53 such as a block of rubber.

All of the operating mechanism is mounted on the crank shaft 35 and consequently that shaft must be well supported and held securely against rotation. As illustrated, these results may be attained by supporting the round portion of each end of the crank shaft in a recess in the inner wall of a box 54 provided at its bottom with outwardly extending lugs whereby it may be secured to the side wall of the conduit, said recess having a suitably rounded bottom and movement of the shaft out of the recess being guarded against by upwardly projecting lugs 55 at opposite sides of the recess, and by cutting down the outer end of the crank shaft into a wedge-shaped portion fitting into a correspondingly shaped recess in a block 56 in said box 54 and supported for rotational adjustment of the crank shaft by means of adjusting screws or bolts 57 secured in adjusted position by means of lock nuts 58. This arrangement renders it easy to install or remove the apparatus.

Operation of the apparatus may be effected by means of an electric motor 59 firmly mounted in the casing 36 (Fig. 5) and connected with a suitable source of electric power by means of conductors in a cable 60 led into the casing through an axial passage in the crank shaft (Fig. 3). The motor 59 acting through speed reducing mechanism including a worm 61 and a worm gear 62 drives a shaft 63 on which is fixed an eccentric 64 that fits into a fork 65 mounted on the crank pin 66 and connected with the crank shaft structure in such a manner that in normal operation the fork remains substantially stationary. This results in the upward and downward movement of the shaft 63 and consequently a corresponding swinging movement of the casing 36 and a downward and upward movement of the rake.

The shaft 63 may also be utilized to rotate the cam members 44 and to this end is provided at each side of the motor with a small gear 67 from which motion is transmitted to a gear 68 on the hub of the adjacent cam member through an idler gear 69 rotatably mounted on a link 70 pivotally mounted on the shaft 63 and the hub of the cam member 44.

Under some conditions material collected on the screen 21 will stop the rake 29, as, for example, the rake approaches the upper surface of the liquid in its upward movement. To avoid breakage or displacement of parts, it may be desired to provide yielding connections whereby operation may be obtained in a shorter path. To this end, the fork 65 is not clamped rigidly on the crank pin 66 but may have some movement around the same and a yielding connection may be provided between the fork and an adjacent crank arm. As illustrated in Figs. 6, 7, 8, and 9, the fork 65 is provided with a suitably shaped projection 71 having an upper cam surface engaged from above by a member 72 and a lower cam surface engaged from below by a member 73, which members are carried by the adjacent crank arm 45 and are urged toward each other by means including a spring 74. The purpose of such cam surfaces will be brought out hereinafter. The member 73 is mounted on the lower end of a sleeve 75 passing slidably through said adjacent crank arm 45, and the upper end of the sleeve 75 is yieldably held in a recess in the member 72 by means including a bolt 76 passing upwardly through the sleeve 75, a nut 77 on the bolt above the upper face of the member 72, and the spring 74 interposed between the head of the bolt and a collar 78 held in the upper end of the sleeve 75.

Although in general the ejector 30 will be held in retracted position by the cam members 44 except when the rake 29 is raised above the upper edge of the bar screen 21, there may be conditions, due, for example, to blocking of the upward movement of the rake 29, under which the timing relation between the various parts may be affected and the ejector released when the rake is not in raised position. Such improper release of the ejector may be avoided by the use of suitable means which may, as illustrated, include guard members 79 fixed on the crank shaft 35 just outside of the frame 51 and adapted to cooperate with rollers or followers 80 pivotally mounted on the frames 51 at the outer sides thereof. Each guard member 79 may be held against rotation around the shaft 35 by any suitable means such as a key 81 (Fig. 13). As shown in Fig. 13, each guard member comprises a dwell portion adapted to cooperate with the corresponding roller 80 and hold the ejector in retracted position except when the rake is in substantially its uppermost position.

In the operation of the screen cleaning apparatus, the motor 59, through suitable speed reducing connections, drives the shaft 63 in a counter-clockwise direction (Figs. 6 and 7) and the eccentric 64 on the shaft 63 cooperates with the fork 65 on the crank pin 66 of the stationary crank shaft 35 in such a manner that the shaft 63 is moved upwardly and downwardly in cycles. Such upward and downward movement of the shaft 63 swings the casing 36 about the ends of the stationary crank shaft 35 and effects corresponding downward and upward movements of the rake 29. The shaft 63 also acts through gears 67, 69 and 68 to rotate the cam members 44 which, through cam grooves 46 therein and rollers or followers 48 on the rake-carrying tubular members 33, move the rake 29 toward and from the screen 21, and, through its cam edge and the followers 52, controls the ejector 30 which under normal conditions is released to the action of the ejector springs 41 only when the rake is in its uppermost position. The action of the eccentric 64 in swinging the rake 29 downwardly is illustrated in Figs. 6, 7, and 8.

The action of the cam members 44 in controlling the advance and retraction of the rake 29 and the ejector 30 is illustrated in Figs. 10, 10A, 11, 12, 12A, 13, and 13A. Figs. 10 and 10A show the positions of the parts when the rake 29 is in its uppermost position and the ejector 30 is in advanced position after release of the followers 52 by the cam edges of the cam members 44. In Fig. 11 the rake 29 has been swung downwardly through about 45° and the cam members 44 have been rotated through about 90° first to retract them and then to hold them in retracted positions. In Fig. 12 the rake has been swung to its lowermost position and it has been advanced to a position to clean the screen during the upward movement of the rake, the ejector 30 being still in retracted position. In Figs. 13 and 13A, the rake 29 has been swung upwardly through about 45° with the ejector still in retracted position. Upon movement of the rake upwardly through another 45°, the ejector 30 will be released by the cam members 44 and will be thrown forward by the springs 41 until checked by engagement of the cushioning devices 53 with the crank shaft 35, thus discharging the material on the rake 29 into the hopper 26.

Due to the yielding connection (Figs. 6 to 9) between the fork 65 and the adjacent crank arm 45, not only will all shocks be cushioned but breakage of parts due to blocking of the rake in its movement will be avoided and even when the rake is blocked in its upward movement the lower part of the screen will still be kept reasonably clear for a time. When the rake is thus blocked, the said yielding connection will yield and, while the rake will not move upwardly to the position for the ejector to act, the cam members 44 will continue to rotate and will release the ejector. Such release, which would obviously be objectionable, will, however, be prevented by the stationary guard members 79.

It will be seen that the tubular extensions 34 of the sections of the casing 36 and the tubular members 33 constitute telescopic rake-supporting arms of which the length is controlled positively. Also all of the working parts are enclosed so as to prevent access of dirt or water. The driving motor as well as the working parts actuated thereby are contained in a casing carried by the shaft 35, thus providing a self contained unit and rendering it easy to install or remove the screen cleaning apparatus and to adjust the same for the level at which the detritus is discharged from the rake. Obviously the balancing of the device on the shaft 35 may be arranged to produce the best results.

In the illustrative embodiment of the invention disclosed herein, the screen cleaning is done by a so-called rake. It should be understood, however, that within the scope of the invention use for this purpose may be made of any suitable screen cleaning devices or scrapers. The term "rake" should therefore be understood as covering not only devices in specific rake form but all other devices suitable for the same purpose.

It should be understood that various changes may be made in the construction and arrangement of parts and that various features can be used without others without departing from the true scope and spirit of the invention.

Having thus described my invention, I claim:

1. In apparatus of the class described, a screen-cleaning member, a fixed shaft held against rotation, a swinging frame on said shaft carrying said screen-cleaning member, and driving means connecting said fixed shaft and said frame for swinging the frame back and forth about the shaft.

2. In apparatus of the class described, a screen-cleaning member, a fixed shaft, a swinging frame on said shaft carrying said screen-cleaning member, and driving means connecting said fixed shaft and said frame to swing the frame back and forth about the shaft, said driving means including connections yielding upon blocking of the screen-cleaning member in one direction and then operating the screen-cleaning member in a shorter path.

3. The combination with an arcuate screen, a screen-cleaning member and a frame carrying said screen-cleaning member and mounted to swing about the axis of curvature of said screen, of means for oscillating said screen-cleaning member along the screen, such oscillating means including connections yielding upon obstruction of the movement of the screen-cleaning member and then operating the screen-cleaning member in a shorter path.

4. The combination with an inclined screen and a screen-cleaning member, of means for oscillating said screen-cleaning member between a position adjacent to the lower edge of the screen and a position just above the upper edge of the screen, such oscillating means including connections yielding upon obstruction of the screen-cleaning member and then operating it in a shorter path, and means for advancing the screen-cleaning member into cooperative relation with the screen when the screen-cleaning member is at the lower end of its path and for withdrawing it from the screen when at the upper end of its path.

5. The combination with an inclined screen and a screen-cleaning member, of means for oscillating said screen-cleaning member between a position adjacent to the lower edge of the screen and a position just above the upper edge of the screen, such oscillating means including connections yielding upon obstruction of the screen-cleaning member and then operating the screen-cleaning member in a shorter path, means for advancing the screen-cleaning member to the screen when the screen-cleaning member is at the lower end of its variable path and for retracting the screen-cleaning member at the upper end of its variable path, an ejector for ejecting material collected on said screen-cleaning members, means for advancing said ejector when the screen-cleaning member is at the upper end of its variable path and for retracting said ejector immediately after its advance movement and holding it retracted until the screen-cleaning member again reaches the upper end of its variable path, and means for preventing advance of said ejector except when the screen-cleaning member is above the upper edge of said screen.

6. In screen-cleaning apparatus, a screen-cleaning member, a fixed shaft constituting a support for all of said apparatus, a supporting device for said member swinging on said shaft, and means for oscillating said supporting device comprising driving connections between said shaft and supporting device including an eccentric rotatably mounted on one of them and a device cooperating with said eccentric and mounted on the other.

7. In screen-cleaning apparatus, a screen-cleaning rake or the like, a shaft held against rotation, a rake-supporting device swinging about the axis of said shaft, and rake-controlling means for advancing the rake on said rake-supporting device to render it effective for cleaning and for retracting it to render it ineffective, said rake-controlling means including a cam rotated on said shaft and a cooperating follower device connected with said rake.

8. In screen-cleaning apparatus, a screen-cleaning rake or the like, a shaft, a rake-supporting device swinging about the axis of said shaft, and rake-controlling means for advancing the rake on said rake-supporting device to render it effective for cleaning and for retracting it to render it ineffective, said rake-controlling means including a cam member rotatable on said shaft and having a cam groove on one side and a follower in said cam groove connected with said rake, whereby the rake will be actuated positively in both directions.

9. In screen-cleaning apparatus, a screen-cleaning rake or the like, a shaft, a frame swinging about the axis of said shaft, rake-carrying arms slidably mounted in said frame for longitudinal movement toward and from the axis of said shaft, an ejector movable along said rake, ejector-controlling arms, springs urging said ejector toward the outer edge of the rake, cam members rotatably mounted on said shaft, each of said cam members being provided with a cam groove at one face to control one of said rake-carrying arms and a cam edge to control the movement of one of said ejector-controlling arms under the urging of its spring, a cam follower on each of said rake-carrying arms to cooperate with the corresponding cam groove, and a cam follower on each of said ejector-controlling arms to cooperate with the corresponding cam edge.

10. The combination with an arcuate screen, and a screen-cleaning member, of actuating means for moving said screen-cleaning member upwardly along said screen, withdrawing it from the screen at the upper end of its path, moving it downwardly while withdrawn from the screen and advancing it to the screen when at the lower end of its path, such actuating means comprising yieldable connections whereby upon obstruction of the screen-cleaning member in its movement along the screen the path of said member will be shortened.

11. The combination with an arcuate screen, and a screen-cleaning member, of actuating means for moving said screen-cleaning member upwardly along said screen, withdrawing it from the screen at the upper end of its path, moving it downwardly while withdrawn from the screen and advancing it to the screen when at the lower end of its path, such actuating means having provisions for yielding whereby upon obstruction of the screen-cleaning member along the screen said member will operate to vary said path by shortening it, a spring-actuated ejector to clean said screen-cleaning member, means to release the ejector at the upper end of its variable path and then retract the same, and means for preventing advance of the ejector at any point below the upper end of its longest path.

12. In screen-cleaning apparatus, a screen-cleaning member, a stationary crank shaft comprising aligned end portions having at their inner ends crank arms connected by a crank pin, said crank shaft constituting a support for all of said apparatus, a rake-supporting device mounted to swing on said shaft, and driving connections between said shaft and said rake-supporting device for oscillating the latter, said driving connections including an eccentric rotatably mounted on said rake-supporting device, a cooperating fork mounted on said crank pin and a yieldable connection between said fork and one of said crank arms including a projection on said fork and yieldably connected members carried by such crank arm and engaging the projection at opposite sides.

13. In screen-cleaning apparatus, a screen-cleaning rake or the like, a shaft, a frame swinging about the axis of said shaft, rake-carrying arms slidably mounted in said frame for longitudinal movement toward and from the axis of said shaft, an ejector movable along said rake, ejector-controlling arms, springs urging said ejector toward the outer edge of the rake, cam members rotatably mounted on said shaft, each of said cam members being provided at one face with a cam groove to control one of said rake-carrying arms and a cam edge to control the movement of one of said ejector-controlling arms under the urging of its spring, a cam follower on each of said rake-carrying arms to cooperate with the corresponding cam groove, a cam follower on each of said ejector-controlling arms to cooperate with the corresponding cam edge, means for yieldably swinging the frame and positively actuating the cam members, and separate means for preventing ejecting movement of the ejector except when the frame is in a predetermined position.

14. In apparatus of the class described, a screen-cleaning member, a shaft held against rotation, a swinging frame on said shaft carrying said screen-cleaning member, driving means connecting said fixed shaft and said frame for swinging the frame back and forth about the shaft, and means for adjusting the shaft rotatably and thereby varying the location of the path in which the rake operates.

15. In apparatus of the class described, a screen-cleaning member, actuating means for moving said screen-cleaning member upwardly and downwardly, retracting the screen-cleaning member at the upper end of its path, holding it retracted during the downward movement and advancing it at the lower end of its path, a spring-actuated ejector traveling upwardly and downwardly with said screen-cleaning member, means to release the ejector and then retract the same and means for preventing advance of the ejector at any point below the uppermost end of its path.

WILLIAM RAISCH.